(12) United States Patent
Emadi et al.

(10) Patent No.: US 11,366,214 B2
(45) Date of Patent: Jun. 21, 2022

(54) SYSTEMS AND METHODS FOR ADAPTIVE CLUTTER REMOVAL FROM RADAR SCANS

(71) Applicant: Woven Planet North America, Inc., Los Altos, CA (US)

(72) Inventors: Mohammad Emadi, San Jose, CA (US); Jamaledin Izadian, San Jose, CA (US); Ali Mostajeran, San Jose, CA (US); Renyuan Zhang, Milpitas, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 207 days.

(21) Appl. No.: 16/730,738

(22) Filed: Dec. 30, 2019

(65) Prior Publication Data
US 2021/0199788 A1 Jul. 1, 2021

(51) Int. Cl.
*G01S 13/538* (2006.01)
*G01S 13/72* (2006.01)
*G01S 13/931* (2020.01)
*G01S 13/00* (2006.01)

(52) U.S. Cl.
CPC ......... *G01S 13/538* (2013.01); *G01S 13/723* (2013.01); *G01S 13/931* (2013.01)

(58) Field of Classification Search
CPC .............................. G01S 13/935; G01S 7/411
See application file for complete search history.

(56) References Cited

U.S. PATENT DOCUMENTS

| | | | | |
|---|---|---|---|---|
| 4,313,115 A * | 1/1982 | O'Sullivan | ........... | G01S 13/931 342/41 |
| 5,343,206 A * | 8/1994 | Ansaldi | ................ | G01S 13/931 342/70 |
| 6,140,954 A | 10/2000 | Sugawara | | |
| 7,532,152 B1 * | 5/2009 | Yonak | ..................... | G01S 7/411 342/175 |

(Continued)

FOREIGN PATENT DOCUMENTS

FR  3067999 A1 * 12/2018 ........... G01S 13/931

OTHER PUBLICATIONS

European Patent Office, International Search Report and Written Opinion for PCT/US2020/067024, dated Apr. 6, 2021, 19 pages.

*Primary Examiner* — Bernarr E Gregory
(74) *Attorney, Agent, or Firm* — Christopher G. Darrow; Darrow Mustafa PC

(57) ABSTRACT

Various embodiments of the present technology can include systems, methods, and non-transitory computer readable media configured to adaptively identify clutter points representing static objects from a sensor data scan. A plurality of sensor data scans are captured, by a sensor unit placed on a vehicle, at a plurality of consecutive time instants while the vehicle is traveling along a route. A set of target points from each of the plurality of sensor data scans is identified. A characteristic indicative of a trajectory pattern relating to one or more respective sets of target points is obtained from one or more sensor data scans taken at consecutive time instants. In response to determining that the characteristic satisfies a pre-defined condition, an indicator with the respective sets of target points is adopted as relating to one or more static objects in an environment at which the vehicle is situated.

20 Claims, 10 Drawing Sheets

(56) References Cited

U.S. PATENT DOCUMENTS

| | | | | |
|---|---|---|---|---|
| 8,249,762 B1 * | 8/2012 | Flotte | ............... | G01S 13/935 |
| | | | | 701/9 |
| 9,581,692 B2 * | 2/2017 | Lamkin | ............ | G01S 13/931 |
| 2003/0174054 A1 | 9/2003 | Shimomura | | |
| 2005/0285774 A1 | 12/2005 | Witenberg | | |
| 2018/0252810 A1 | 9/2018 | Uotsu | | |
| 2018/0356496 A1 | 12/2018 | Farzone | | |

* cited by examiner

SYSTEMS AND METHODS FOR ADAPTIVE CLUTTER REMOVAL FROM RADAR SCANS

FIELD OF THE INVENTION

The present technology relates to vehicle systems and navigation systems. More particularly, the present technology relates to systems, apparatus, and methods for adaptive clutter removal from radar scans captured by radar systems on a vehicle.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may be installed with a radar unit, along with other sensors such as an inertial measurement unit (IMU), which provides measurement data of objects in the environment that the vehicle is situated at such that the vehicle can make or assist a human driver to make a navigation decision. Such measurement data usually includes echoes from moving objects (e.g., pedestrians, other vehicles, etc.), and from static objects in the environment (e.g., ground, trees, buildings, street lamps, etc.).

As information relating to the static objects in the environment is less interesting to the intelligent vehicle, echoes from static objects, herein referred to as "clutter," are usually removed from radar scans for better tracking of moving objects within the sensing range of the vehicle. Traditionally, clutter is defined and removed based on map data, e.g., buildings, trees, street lamps, etc. that are identified in the geometric map data. Such map-based clutter removal mechanism can be highly unreliable because echoes from moving objects in vicinity to a static object labeled in the map may also be erroneously removed. For example, when a person walks out of a building into the street, echoes from the person may be erroneously identified as part of the echoes from the building, and thus should be removed. The radar system may then fail to detect that the person is walking into the street.

Traditionally, clutter is defined and removed based on its location in reference to map data, e.g., buildings, trees, street lamps, etc. that are identified in the geometric map data. Such map-based clutter removal mechanism can be highly unreliable, because echoes from moving objects in vicinity to a static object labeled in the map may also be erroneously removed. For example, when a person who just walks out of a building into the street, echoes from the person may be erroneously identified as part of the echoes from the building or trees, and thus may not be recognized by the system. The radar system may then fail to detect that the person is trying to walk into the street until they are some distance from the trees or building. Additionally, observing and focusing resources on all such static objects may be wasteful and adversely affects the performance capabilities of the system.

SUMMARY

Various embodiments of the present technology can include systems, methods, and non-transitory computer readable media configured to adaptively identify clutter points representing static objects from a sensor data scan. A plurality of sensor data scans are captured, by a sensor unit placed on a vehicle, at a plurality of consecutive time instants while the vehicle is traveling along a route. A set of target points from each of the plurality of sensor data scans is identified. A characteristic indicative of a trajectory pattern relating to one or more respective sets of target points is obtained from one or more sensor data scans taken at consecutive time instants. In response to determining that the characteristic satisfies a pre-defined condition, an indicator with the respective sets of target points is adopted as relating to one or more static objects in an environment at which the vehicle is situated.

In some embodiments, the characteristic is determined by computing an average Doppler velocity between locations of the one or more respective sets of target points. It is then determined whether a magnitude of the average Doppler velocity is below a threshold, or whether a direction of the average Doppler velocity is random compared with a prior Doppler velocity determined based sensor data scans captured prior to the one or more sensor data scans.

In some embodiments, the characteristic is determined by computing, based on an inertial coordinate system, a track of the one or more respective sets of target points across the one or more sensor data scans. It is then determined whether a direction of the track is uniform in the inertial coordinate system.

In some embodiments, the direction of the track is determined by sampling a plurality of points at consecutive time instants from the computed track. It is then determined whether a direction parameter along the plurality of sampled points has changed more than a threshold number of times during the consecutive time instants.

In some embodiments, the characteristic is determined by computing, based on an inertial coordinate system, an average displacement vector between a first set of target points from a first sensor data scan captured at a first time instant and a second set of target points from a second sensor data scan captured at a second time instant later than the first time instant. It is then determined whether a magnitude of the average displacement vector is greater than a threshold.

In some embodiments, the characteristic is determined by computing a respective point density for the respective set of target points. It is then determined whether the respective point density is greater than a threshold.

In some embodiments, a first characteristic and a second characteristic relating to the one or more respective sets of target points from one or more sensor data scans taken at consecutive time instants are determined. In response to determining that the first characteristic and the second characteristic have conflicting indications of whether the respective sets of target points relate to one or more static objects, a pre-defined priority rule ranking the first characteristic and the second characteristic is applied. An indication associated with a respective characteristic that has a higher priority from the pre-defined priority rule is adopted.

In some embodiments, the characteristic with the one or more sensor data scans taken in real time is obtained while the vehicle is traveling along a route. In response to determining that the characteristic no longer satisfies the pre-defined condition, the indicator with the respective sets of target points as relating to the one or more static objects is removed.

In some embodiments, a percentage of time when the respective set of target points is associated with the indicator as relating to the one or more static objects is determined, over a period of time. In response to determining that the percentage of time is less than a threshold, the respective set of target points continue to be monitored in subsequent sensor data scans.

In some embodiments, in response to determining that the percentage of time is greater than a threshold, target points corresponding to the set of target points in a subsequent sensor data scan are removed.

Figure 1A:
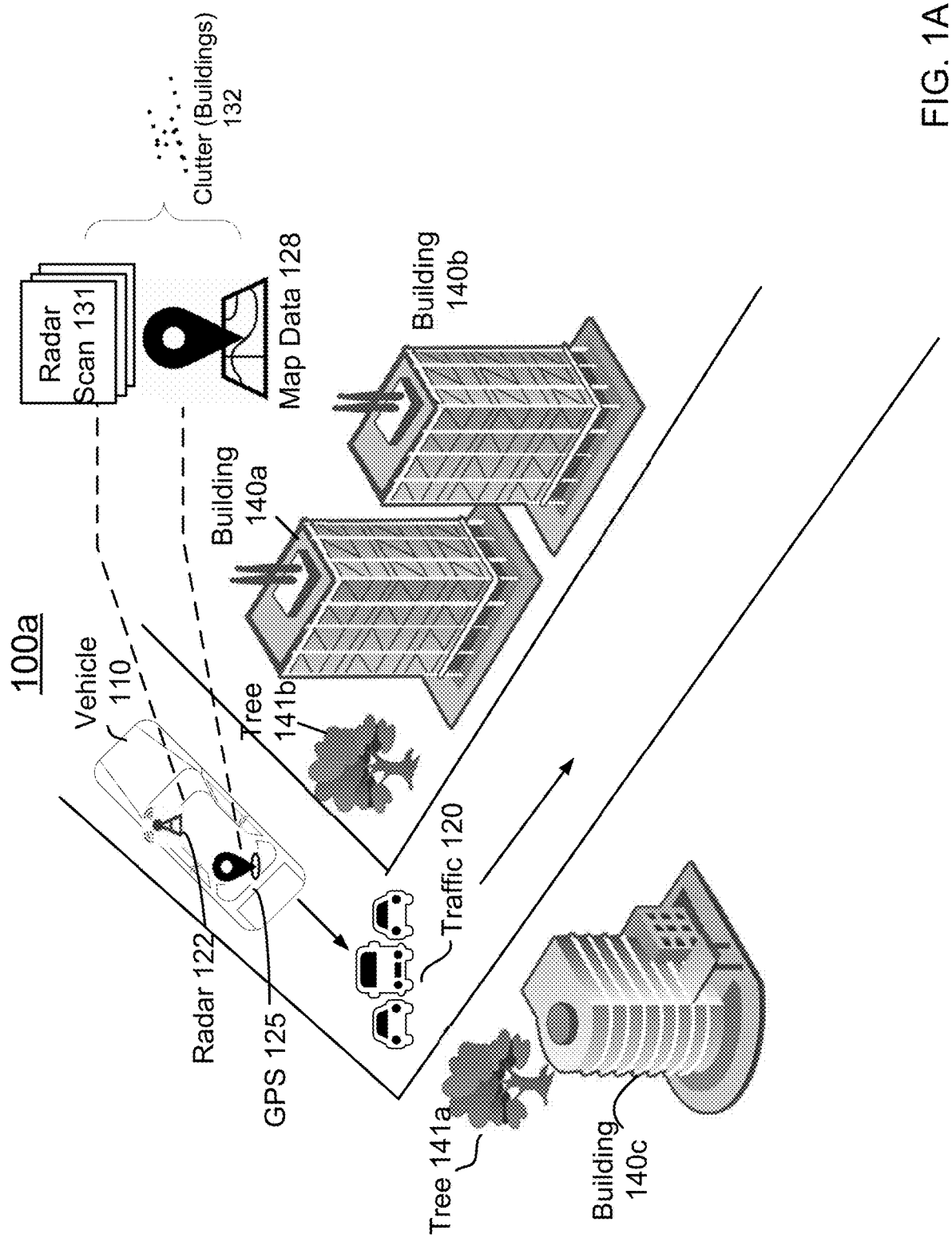
FIGS. 1A-1C are block diagrams illustrating an example overview of clutter removal for a vehicle using a map-based approach (FIGS. 1A-1B), compared with adaptive clutter removal without using any geometric map data while the vehicle is moving around a street corner (FIG. 1C), according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may be installed with a radar unit, along with other sensors such as an inertial measurement unit (IMU), which provides measurement data of objects in the environment that the vehicle is situated at such that the vehicle can make or assist a human driver to make a navigation decision. Such measurement data usually includes echoes from moving objects (e.g., pedestrians, other vehicles, etc.), and from static objects in the environment (e.g., ground, trees, buildings, street lamps, etc.).

Traditionally, clutters are defined and removed based on map data, e.g., buildings, trees, street lamps, etc. that are identified in the geometric map data. The required map data, such as a geometric map of a geographic location, can include data pertaining to geometric features (e.g., physical features) that correspond to the geographic location. A geometric map may include, for example, positions and/or shapes of physical structures or objects or other physical features in a geographic location.

FIG. 1A provides an example block diagram 100a illustrating an example overview of clutter identification and removal for a vehicle 110 using a conventional map-based approach, such as discussed above. Diagram 100a shows vehicle 110 traveling in the street, with static objects such as the trees 141a-b and various buildings 140a-c on both sides of the street. The vehicle 110 is equipped with a GPS system 125 and a radar system 122. The radar system 122 may capture a series of radar scans 131, which may include target points representing moving objects (such as the traffic of other moving vehicles 120 in the street, etc.) and static objects (such as trees 141a-b, buildings 140a-c on the side of the street, etc.). When all objects within a distance to the vehicle 110 are captured in the radar scan 131, the computing system of the vehicle 110 may take the time and processing capacity to analyze the characteristics and/or trajectories of these objects. However, as the static objects often do not change their locations and/or positions, clutter points representing the static objects from each radar scan are usually less relevant for the vehicle 110 to make a safe navigation decision. Thus, by removing such clutter, the computing system of vehicle 110 can better focus processing resources on the tracked moving objects, such as the moving traffic 120 in the street. For example, as further illustrated in FIG. 3, radar scans after clutter removal (e.g., 301b) contain a less complicated distribution of target points as compared to radar scans without clutter removal (e.g., 301a). Clutter removal thus reduces the complexity of radar scan analysis and improves system computing efficiency.

To use the traditional map-based approach to remove unwanted clutter representing static objects, precise location information of the vehicle 110 must be obtained from the GPS system 125 for the vehicle 110 to obtain pre-defined map data 128 associated with a specific location. The map data 128 must contain detailed geometric information at the location such as the positions and/or shapes of physical structures or objects or other physical features, such as trees 141a-b, buildings 140a-c and/or the like in the geographic location. The vehicle 110 may then compare received echoes from the radar scans 131 captured by the radar unit 122 with the geometric map data 128 to determine whether a cluster of target points are clutter 132. For example, if the map data 128 indicates a building 140a at a specific location within vicinity of the vehicle 110, the vehicle 110 may verify whether a captured radar scan 131 shows clutter points having a physical shape of a building at certain coordinates corresponding to the location of building 140a relative to vehicle 110. In some embodiments, identified clutter points, e.g., representing the building 140a based on the geometric map data 128, can be removed from the radar scan 131 such that the radar unit 122 can focus on tracking moving objects in the environment.

Figure 1B:
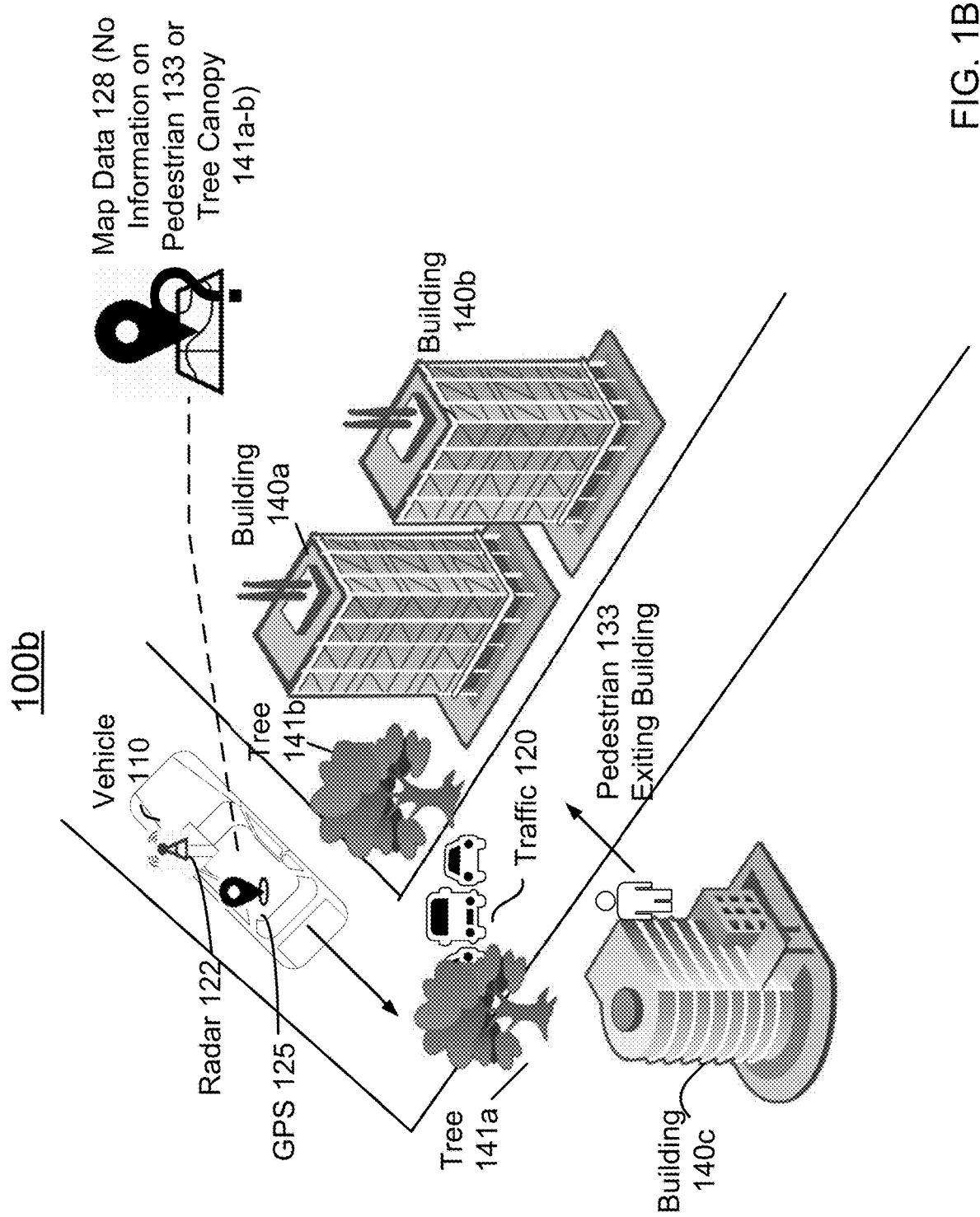

However, such map-based clutter removal mechanism can be highly unreliable because echoes from moving objects in vicinity to a static object labeled in the map may also be erroneously removed. For example, FIG. 1B provides an example block diagram 100b illustrating an example scenario when echoes from a pedestrian 133 may be erroneously identified as part of clutter using the map-based approach. As shown at diagram 100b, when a pedestrian 133 walks out of a building 140c into the street, echoes from the pedestrian 133 for the radar system 122 may be mingled with the echoes from the building 140c, as the pedestrian 133 is in proximity of the building 140c. Thus, if the radar system 122 relies on the map data 128 to identify static objects in the environment, the radar system 122 may erroneously identify and even remove echo points representing the pedestrian 133 as a part of the clutter representing the building 140c based on the location of building 140c indicated by the geometric map data 128.

Figure 2:
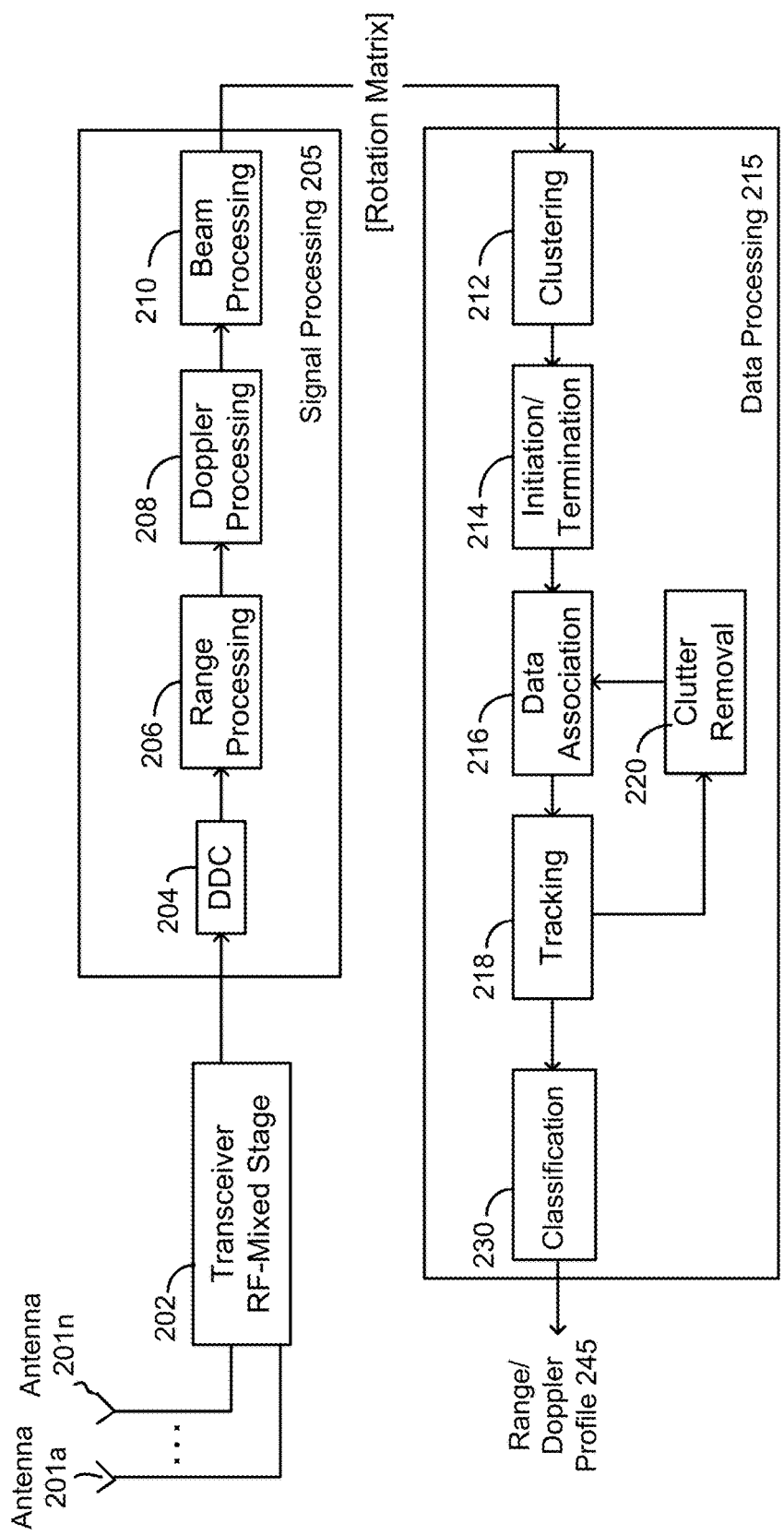
FIG. 2 illustrates an example radar system that may be equipped with a vehicle system, according to an embodiment of the present technology.

In addition, the geometric map data 128 may not be the most up-to-date and may fail to capture changes in the physical shapes of the static objects in the environment. For example, diagram 100b shows static objects in the environment may include trees 141a-b by the sides of the street. The physical shape of trees 141a-b may be time-dependent and vary from season to season. The map data 128 may identify the location of trees 141a-b but may lack information on the exact physical shape of the tree crowns which may change over seasons. For instance, as shown in FIG. 2, when the tree crowns grow and extend across the street to form a canopy, the geometric map data 128 is often insufficient to identify the exact "location" of the tree canopy, because the map data 128 may only have information about information as to where the roots of the trees 141a-b are originally planted. Thus, the clutter of the tree canopy usually cannot be removed solely based on the geometric map data 128. When traffic of moving vehicles 120 passes under the canopy, the clutter of the tree canopy may be intertwined with the target points representing the moving traffic 120, thus significantly affecting visibility of target points of moving objects in the street. If the radar system 122 only relies on the map data 128 that indicates the locations of tree 141a-b to remove clutter of trees, clutter of the tree canopy may not be removed from radar scans. Thus, the traditional map-based clutter removal can be unreliable in identifying actual clutter in the environment.

Figure 1C:
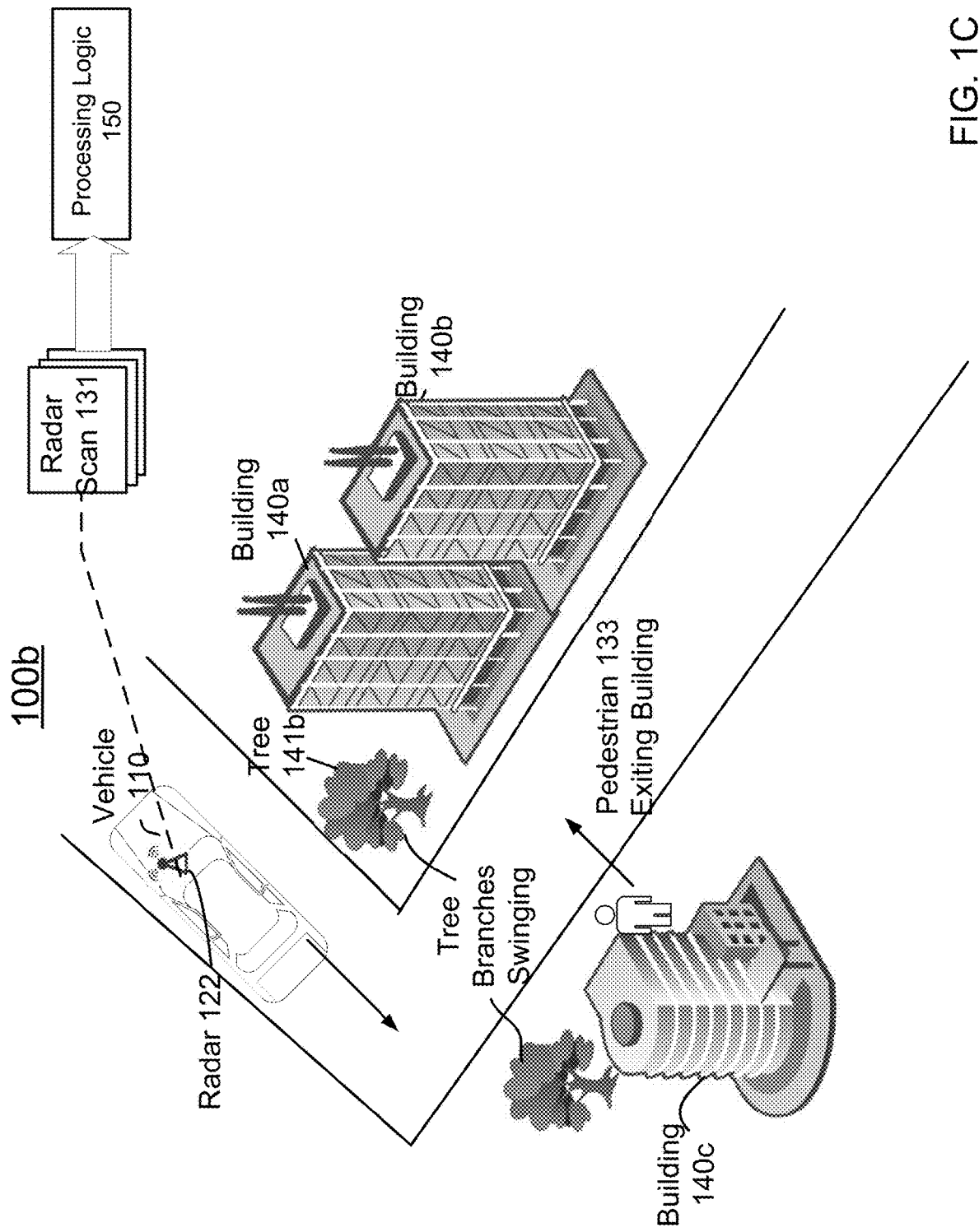

In view of the need for a more accurate and reliable clutter removal mechanism, embodiments described herein provide an adaptive clutter removal, which, instead of relying on the locations of pre-defined static objects from map data, adaptively observes and assesses whether sensed echoes from radar scans represent a static object based on a set of criteria. FIG. 1C provides a diagram 100c illustrating an example overview of adaptive clutter removal by analyzing characteristics of radar echoes in a series of radar scans without using any geometric map data while the vehicle 110 is moving. As shown in diagram 100c, the radar unit 122 on the vehicle 110 continues to capture a series of radar scans 131 as the vehicle 110 is moving. Without relying on location information of the vehicle 110 or any map data, the vehicle 110 may use processing logic 150 to analyze the captured radar echoes to determine whether any target points are clutters representing a static object in the background.

Figure 1D:
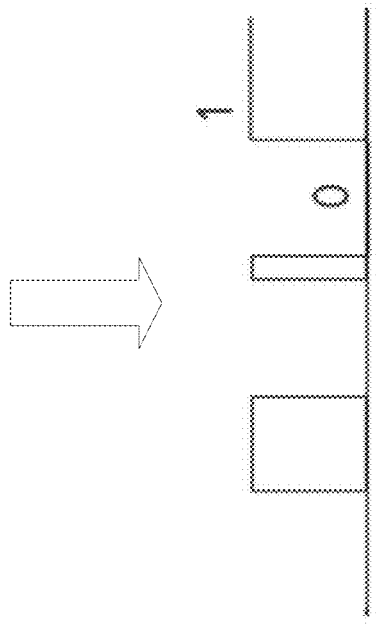
FIG. 1D provides a diagram illustrating a processing logic used for analyzing captured target points for adaptive clutter removal, according to an embodiment of the present technology.

FIG. 1D provides a diagram illustrating the processing logic 150 used for analyzing captured target points. In some embodiments, the processing logic 150 may evaluate whether the doppler change of a cluster of target points is small and random, or the track of the cluster of target points are non-uniform. As used herein, the term "random" refers to a characteristic of a movement that does not exhibit a steady pattern, e.g., the velocity vector of the movement constantly changes in irregular directions. As used herein, the term "uniform" refers to a characteristic of a movement that the direction of the movement changes for more than a threshold number of times within a period of time.

For example, the tree branches of trees 141a-b may generate slight movement of swinging, which does not exhibit a track of steady and directional movement. Such movement of non-uniform or random directions is unlikely associated with a moving object that the vehicle 110 is interested in tracking, e.g., a moving vehicle, a pedestrian crossing the street, etc. Thus, the cluster of target points exhibiting small or random movement, or non-uniform tracks may be flagged as clutter.

In some embodiments, the processing logic 150 may evaluate the displacement vector of a cluster of target points over a period of time. For example, when the cluster of target points have little displacement change in the global coordinate system, indicating the cluster of target points have been relatively static during the period of time, the cluster of target points may be determined to be related to one or more static objects.

In some embodiments, processing logic 150 evaluates the density of a cluster of target points. For example, when the number of target points in the cluster over a series of radar scans 131 are relatively large, e.g., higher than point density in other regions in the radar scan 131, the high-density cluster of target points are likely related to a static object. For instance, radar echoes of buildings 140a-c are likely to form regions of high density on the radar scans 131.

The processing logic 150 may then track and label the determined clutter with a clutter flag for a series of radar scans. For example, as shown at 151, the processing logic 150 may flag a cluster of target points as "clutter" (e.g., flag=1) when any of the criteria described above is satisfied at a time instance, and may remove the clutter flag (e.g., flag=0) at a later time instance when none of the criteria described above is satisfied at a later time.

In some embodiments, the processing logic 150 may remove the cluster of target points identified as clutter from radar scans when the clutter flag=1 for the cluster of target points for more than a number of consecutive radar scans, e.g., 9 out of every 10. The processing logic 150 may dynamically and periodically re-evaluate all captured radar echoes to determine whether any of the target points (including previously removed ones) are still considered clutter.

In this way, by dynamically and adaptively monitoring and analyzing characteristics of cluster of target points, the vehicle 110 may determine static objects in the environment using real-time radar data without relying on map data that is potentially obsolete or inaccurate. For example, the processing logic 150 may accurately identify target points relating to the pedestrian 133 are not clutter because the movement pattern of echoes from the pedestrian 133 would exhibit a steady track in one direction, and the displacement vector of the pedestrian 133 would be non-trivial over time. Thus, the processing logic 150 may capture the movement pattern of the pedestrian 133 as non-clutter and distinguish the pedestrian 133 from the building 140c in the background, as opposed to the traditional map-based approach which would consider the pedestrian 133 as part of the building 140c because the pedestrian 133 is located at the location identified as "building 140c." For another example, the processing logic 150 may accurately identify target points relating to tree branches from trees 141a-b as clutter because the movement of the tree branches, e.g., swinging with the wind, only has small or random movement pattern, non-uniform track of direction, and the displacement vector over time can be trivial—unlike the traditional map-based approach which may fail to include the tree branches as part of clutter because the tree branches may extend beyond the location spot identified in the map data.

FIG. 2 is an example block diagram 200 illustrating an example structure of a radar processing unit (e.g., the radar unit 122) at the vehicle 110 shown in FIGS. 1A-1D. The radar processing unit includes a transceiver 202, which is configured to receive, via one or more antennas 201a-n, radio frequency (RF) signals representing reflections from objects in the environment where the vehicle is situated. For example, RF signals reflected from the trees 141a-b, buildings 140a-c as shown in FIGS. 1A-1B may be received at the transceiver 202.

The transceiver 202 is configured to process RF signals at a RF-mixed stage block 202, and then send the processed RF signal to a signal processing block 205 that includes a digital down converter (DDC) 204, which down samples and transmits the processed RF signal for range processing by a range processing block 206, which then transmits its output to a doppler processing block 208 that then transmits its processed signal to a beam processing block 210. After signal processing by signal processing block 205, a rotation matrix may be applied to the output of the signal processing block 205 to formulate a set of raw data points, which are fed to a data processing block 215.

At data processing block 215, a clustering block 212 is configured to determine a cluster of target points from the raw radar data. An initiation/termination block 214 may determine whether and when the determined cluster is to be tracked as a moving object and when to terminate the tracking. A data association block 216 may associate clusters of points from radar data captured at different times as representing the same object. A tracking block 218 may track a cluster of points that represents a moving or static object from radar data captured at different times. A classification block 230 may classify the tracked radar data from the tracking block 218, which in turn provides range/doppler profile data 245 of tracked target points. For example, the range/doppler profile data 245 may include the azimuth, range, velocity, coordinates in the inertial coordinate system, coordinates in the radar coordinates of the target, and/or the like.

A clutter removal block 220 may receive radar echo data from the tracking block 218, based on which the clutter removal block 220 may determine whether a cluster of target points are to be flagged as clutter. The clutter removal block 220 may then output the clutter flags to the data association block 216 for associating a cluster of target points as clutter.

Figure 3:
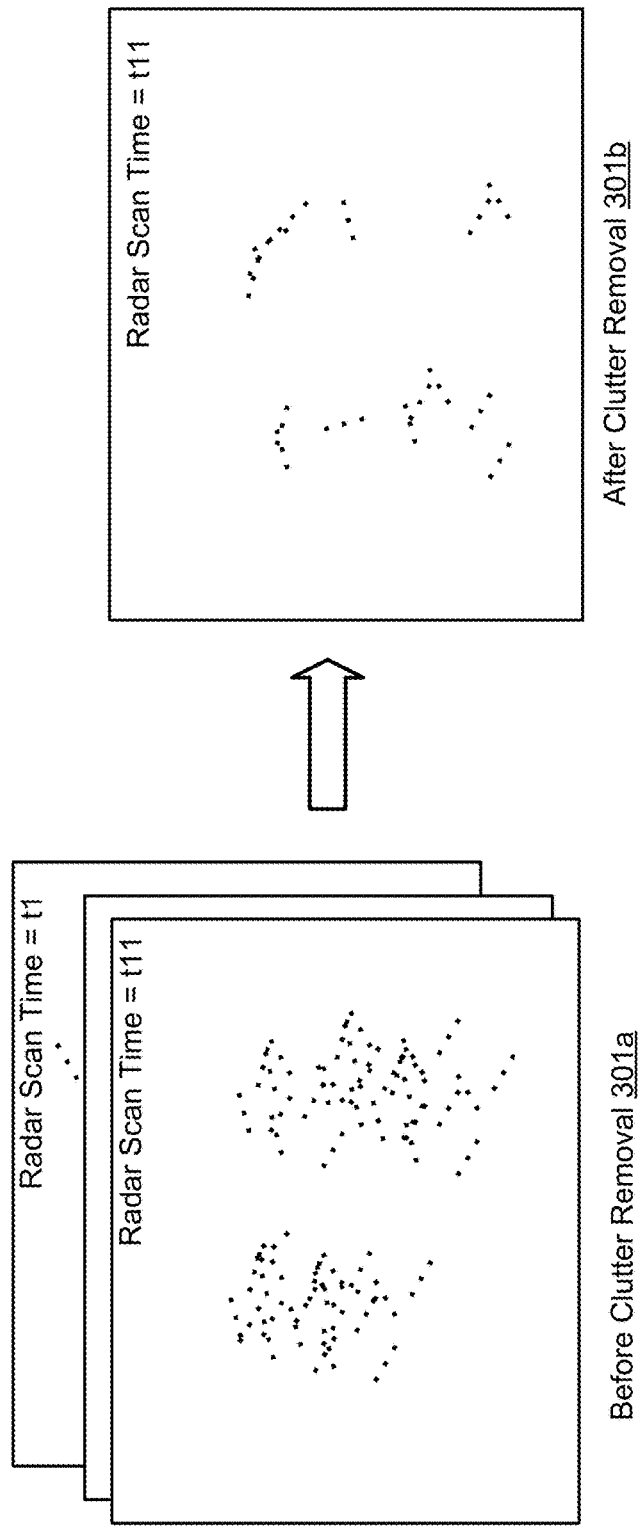
FIG. 3 illustrates example schematic radar images before and after the clutter points are removed, according to an embodiment of the present technology.

FIG. 3 illustrates example schematic radar images before and after the clutter points are removed. Diagram 300 shows a series of radar scans 301a taken at consecutive time intervals (e.g., every 50-100 ms). The target points on the radar scans 301a may be analyzed based on processing logic 150 described in FIG. 1C to determine whether the target points correspond to clutter.

In some embodiments, if a cluster of target points are flagged as clutter at a time instance or has been flagged as clutter for more than a number of radar scans taken at consecutive time instances (e.g., 9 out of 10), the cluster of target points may be removed as clutter from the radar scan 301a. The resulting radar scan after clutter removal 301b may provide better focus on echoes of moving objects around the vehicle, thus providing better support for the vehicle to make navigation decisions.

Figure 4:
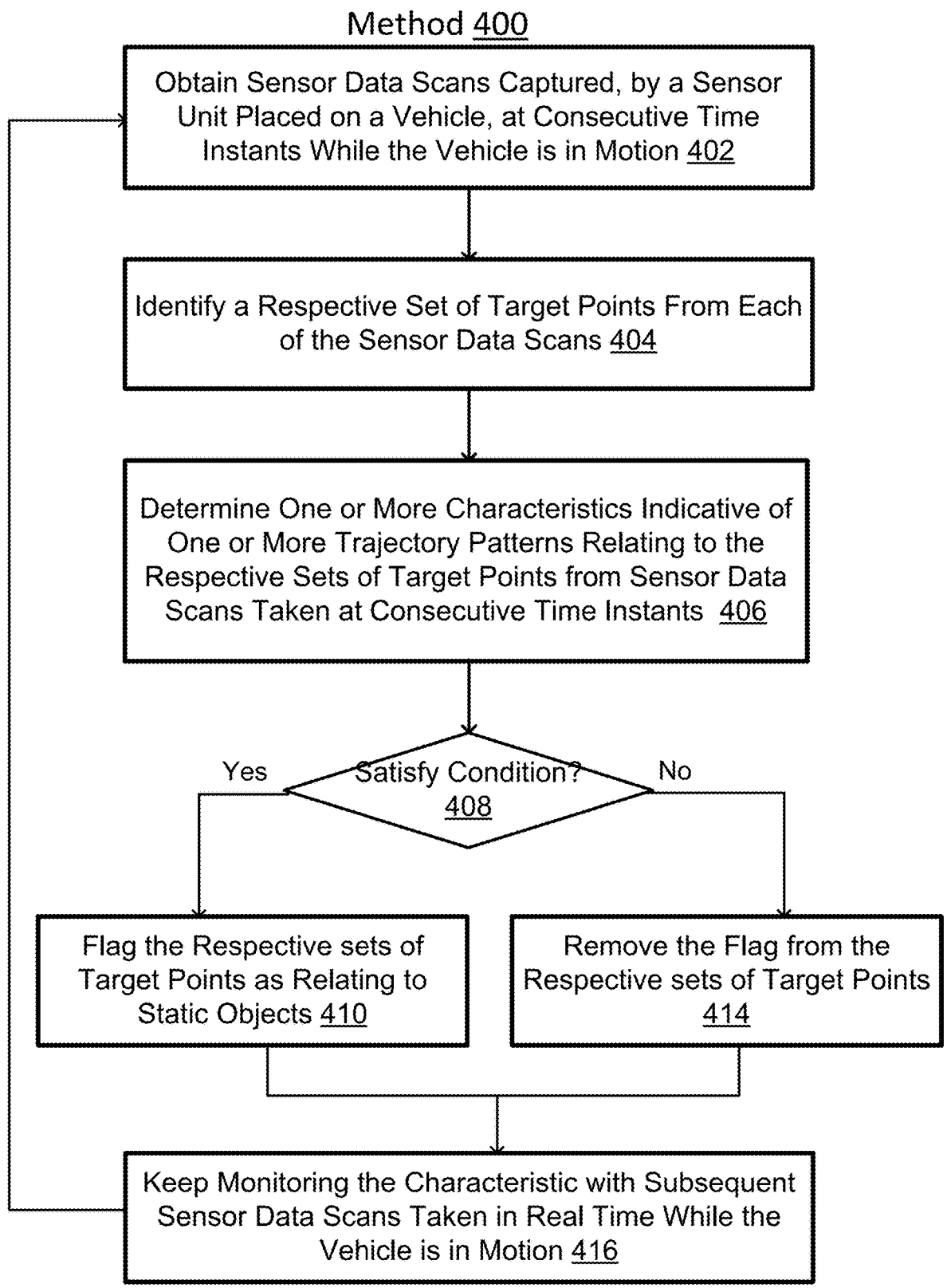
FIG. 4 is an example logic flow diagram illustrating a method performed by a processing unit on the vehicle to adaptively remove clutters from radar scans while the vehicle is moving, according to an embodiment of the present technology.

FIG. 4 is an example logic flow diagram illustrating a method 400 performed by a processing unit on the vehicle to adaptively remove clutter from radar scans while the vehicle is moving. One or more of the processes or steps 402-416 of method 400 may be implemented, at least in part, in the form of executable code stored on non-transitory, tangible, machine-readable media (e.g., memory 704 and/or storage 706 in FIG. 7) that when run by one or more processors (e.g., processor 702 in FIG. 7) may cause the one or more processors to perform one or more of the processes 402-416. Further, one or more of the processes or steps may be omitted, combined, or performed in a different order as desired.

At step 402, a plurality of sensor data scans (e.g., radar scans 131 in FIG. 1C) captured, by a sensor unit (e.g., radar unit 122 in FIG. 1C) placed on a vehicle (e.g., 110 in FIG. 1C), at a plurality of consecutive time instances while the vehicle is traveling along a route are captured. For example, as shown in FIG. 1C, the radar unit 122 may capture radar scans 131 containing echoes from the surroundings of the vehicle 110, including trees 141a-b, buildings 140a-c, pedestrian 133, etc.

At step 404, a set of target points from each of the plurality of sensor data scans is identified. For example, the set of target points may be selected by dividing a radar scan into grids or regions, and echo points from each grid or region are analyzed as a set of target points.

At step 406, one or more characteristics indicative of a trajectory pattern relating to one or more sets of target points from one or more sensor data scans taken at consecutive time instances are determined. Examples of the characteristics are further discussed in relation to FIG. 5.

At step 408, if at least one characteristic satisfies a pre-defined condition or criterion, the set of target points are flagged as clutter, e.g., relating to static objects in an environment at which the vehicle is situated at step 410. Otherwise, at step 414, if none of the characteristics satisfies the corresponding pre-defined condition or criterion, the set of target points will not be flagged as clutter—or if the set of target points has been previously flagged as clutter from an earlier radar scan, the clutter flag may be removed.

At step 416, the method 400 may keep monitoring characteristics of the set of target points in subsequent radar scans taken in real time while the vehicle continues moving. For example, method 400 may then proceed back to step 402.

Figure 5:
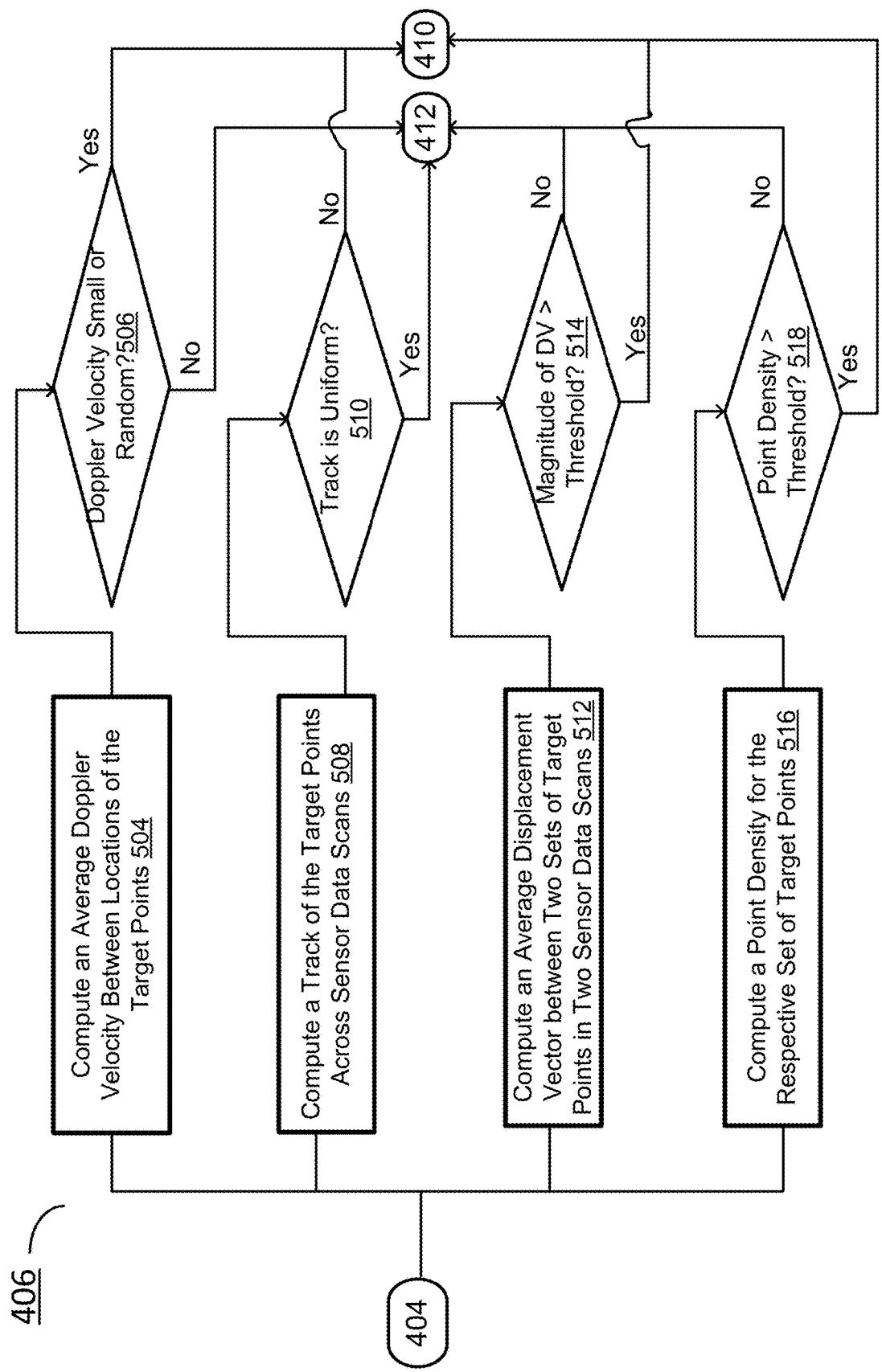
FIG. 5 is an example logic flow diagram illustrating the process of adaptively determining whether a set of target points are clutters over a series of radar scans, according to an embodiment of the present technology.

FIG. 5 is an example logic flow diagram illustrating the process 406 shown in FIG. 4 of adaptively determining whether a set of target points are clutter over a series of radar scans. One or more of the processes or steps 504-518 of process 406 may be implemented, at least in part, in the form of executable code stored on non-transitory, tangible, machine-readable media (e.g., memory 704 and/or storage 706 in FIG. 7) that when run by one or more processors (e.g., processor 702 in FIG. 7) may cause the one or more processors to perform one or more of the processes 504-518. Further, one or more of the processes or steps may be omitted, combined, or performed in a different order as desired.

Proceeding from step 404 in FIG. 4, process 406 may proceed with any of steps 504, 508, 512 and 516. One or more of steps 504, 508, 512 and 516 may be implemented in parallel, or be selectively implemented based on availability of radar data or on demand.

At step 504, an average doppler velocity between locations of the target points across radar scans captured at consecutive time instances is computed. For example, the doppler velocity of the set of target points may be averaged out. At step 506, the magnitude of the average Doppler velocity may be compared with a pre-determined threshold. Or, the direction of the average Doppler velocity vector may be compared with the direction of the average Doppler velocity at the previous radar scan. If the Doppler velocity is lower than a threshold magnitude and/or changes direction frequently or arbitrarily, e.g., exhibiting a random pattern, the set of target points may be flagged as clutter at step 410 in FIG. 4. Otherwise, process 406 proceeds to step 412.

At step 508, the track of the set of target points across the one or more sensor data scans is computed. For example, based on an inertial coordinate system or the radar coordinate system, the direction of the track may be evaluated at step 510. For example, target points are sampled at consecutive time instances from the computed track, and a direction parameter (e.g., the velocity vector corresponding to each target point) may be computed. If the direction parameters have changed for more than a threshold number of times during the consecutive time instances, the direction of the track is considered non-uniform. In this case, the process 406 proceeds to 410 to flag the target points as clutter. Otherwise, process 406 proceeds to step 412.

At step 510, an average displacement vector between a first set of target points from a first sensor data scan captured at a first time instance and a second set of target points from a second sensor data scan captured at a second time instance later than the first time instance may be computed, e.g., based on the difference between the coordinates of the first set of target points and the coordinates of the second set of target points. At step 512, the magnitude of the average displacement vector compared with a pre-defined threshold to evaluate whether the target points have moved at least a threshold distance between the two time instances. Thus, when the magnitude of the average displacement vector is greater than the pre-defined threshold, the process 406 proceeds to 410 to flag the target points as clutter. Otherwise, process 406 proceeds to step 412.

At step 512, the point density for the set of target points is computed, e.g., the number of points in the set is divided by the area of region that the target points occupy on the radar scan. At step 514, when the point density is greater than a pre-defined threshold, process 406 proceeds to 410 to flag the target points as clutter. Otherwise, process 406 proceeds to step 412.

In some embodiments, one or more criteria at steps 506, 510, 514 and 518 may be evaluated by process 406 to determine whether a clutter flag shall be placed with the set of target points. When the evaluations of different criteria yield conflicting results, e.g., when the set of target points exhibit small and random Doppler velocities at step 506 but do not have a high point density at step 518, a pre-defined priority rule ranking the different characteristics and the associated criteria is applied, which adopts an indication of clutter or no clutter based on a particular characteristic that has a higher priority from the pre-defined priority rule. For example, process 406 may evaluate the characteristics by a rank of Doppler velocity, track pattern, displacement vector and point density.

Figure 6:
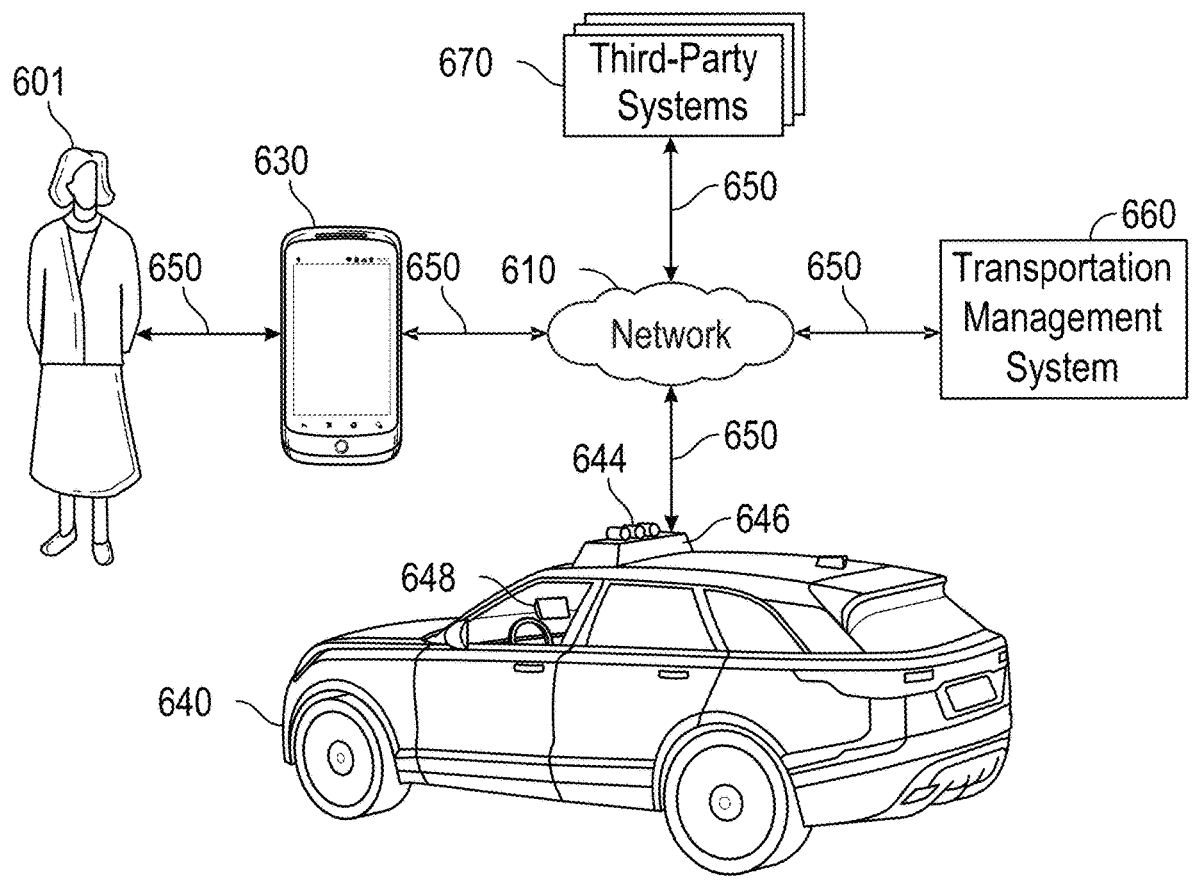
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules shown in FIG. 2 may be implemented by one or more computing systems of the transportation management system 660. In some embodiments, some or all modules shown in FIG. 2 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
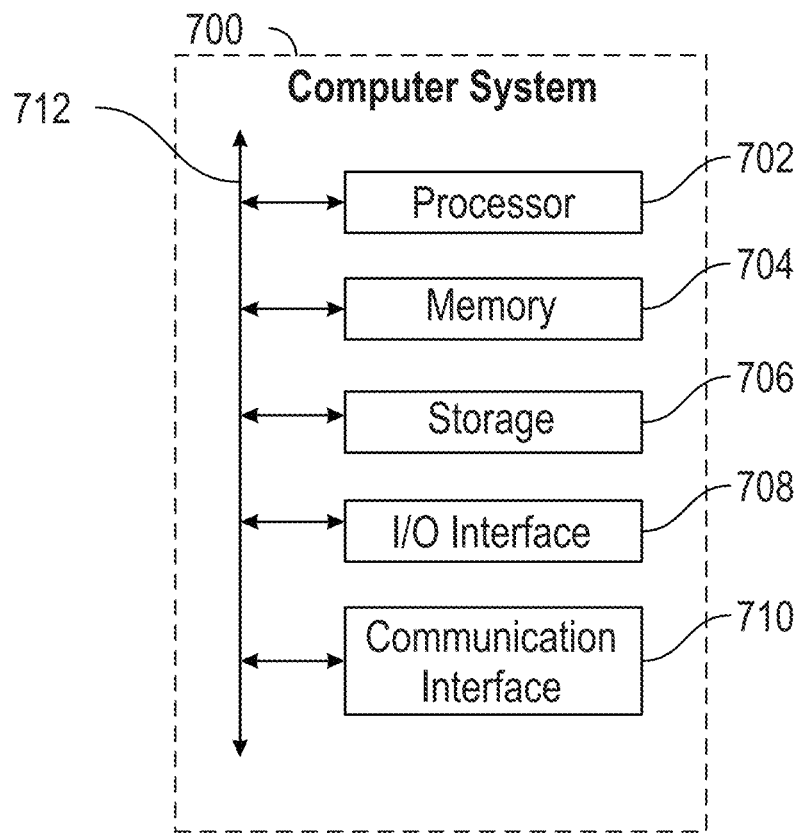
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface

708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method of adaptively identifying clutter points representing static objects from a sensor data scan, the method comprising:
   obtaining a plurality of sensor data scans captured, by a sensor unit associated with a vehicle, at a plurality of consecutive time instants while the vehicle is traveling;
   identifying a respective set of target points from each of the plurality of sensor data scans;
   determining a characteristic indicative of a trajectory pattern relating to one or more respective sets of the target points, wherein the characteristic indicative of the trajectory pattern is determined by computing an average Doppler velocity between locations of the one or more respective sets of target points; and in response to determining that the characteristic satisfies a pre-defined condition, associating an indicator with the respective sets of target points as relating to one or more static objects in an environment in which the vehicle is situated.

2. The method of claim 1, wherein the characteristic indicative of the trajectory pattern is determined by:
determining whether a magnitude of the average Doppler velocity is below a threshold, or whether a direction of the average Doppler velocity is random compared with a prior Doppler velocity determined based sensor data scans captured prior to the one or more sensor data scans.

3. The method of claim 1, wherein the characteristic indicative of the trajectory pattern is determined by:
computing, based on an inertial coordinate system, a track of the one or more respective sets of target points across the one or more sensor data scans, and determining whether a direction of the track is uniform in the inertial coordinate system.

4. The method of claim 3, wherein the determining whether the direction of the track is uniform in the inertial coordinate system further comprises:
sampling a plurality of points at consecutive time instants from the computed track; and
determining whether a direction parameter along the plurality of sampled points has changed more than a threshold number of times during the consecutive time instants.

5. The method of claim 1, wherein the characteristic indicative of the trajectory pattern is determined by:
computing, based on an inertial coordinate system, an average displacement vector between a first set of target points from a first sensor data scan captured at a first time instant and a second set of target points from a second sensor data scan captured at a second time instant later than the first time instant; and
determining whether a magnitude of the average displacement vector is greater than a threshold.

6. The method of claim 1, wherein the characteristic indicative of the trajectory pattern is determined by:
computing a respective point density for the respective set of target points; and
determining whether the respective point density is greater than a threshold.

7. The method of claim 1, further comprising:
determining a first characteristic and a second characteristic relating to the one or more respective sets of target points from one or more sensor data scans taken at consecutive time instants; and
in response to determining that the first characteristic and the second characteristic have conflicting indications of whether the respective sets of target points relate to one or more static objects:
applying a pre-defined priority rule ranking the first characteristic and the second characteristic; and
adopting an indication associated with a respective characteristic that has a higher priority from the pre-defined priority rule.

8. The method of claim 1, further comprising:
monitoring the characteristic indicative of the trajectory pattern with the one or more sensor data scans taken in real time while the vehicle is traveling along a route; and
in response to determining that the characteristic no longer satisfies the pre-defined condition, removing the indicator with the respective sets of target points as relating to the one or more static objects.

9. The method of claim 8, further comprising:
determining, over a period of time, a percentage of time when the respective set of target points is associated with the indicator as relating to the one or more static objects; and
in response to determining that the percentage of time is less than a threshold, continuing monitoring the respective set of target points in subsequent sensor data scans.

10. The method of claim 9, further comprising:
in response to determining that the percentage of time is greater than a threshold, removing target points corresponding to the respective set of target points in a subsequent sensor data scan.

11. A system comprising:
one or more non-transitory computer-readable storage media embodying instructions; and
one or more processors coupled to the storage media and operable to execute the instructions to:
obtain a plurality of sensor data scans captured, by a sensor unit associated with a vehicle, at a plurality of consecutive time instants while the vehicle is traveling;
identify a respective set of target points from each of the plurality of sensor data scans;
determine a characteristic indicative of a trajectory pattern relating to one or more respective sets of target points, wherein the characteristic indicative of the trajectory pattern is determined by computing an average Doppler velocity between locations of the one or more respective sets of target points; and
in response to determining that the characteristic satisfies a pre-defined condition, associate an indicator with the respective sets of target points as relating to one or more static objects in an environment at which the vehicle is situated.

12. The system of claim 11, wherein the characteristic indicative of the trajectory pattern is determined by:
determining whether a magnitude of the average Doppler velocity is below a threshold, or whether a direction of the average Doppler velocity is random compared with a prior Doppler velocity determined based sensor data scans captured prior to the one or more sensor data scans.

13. The system of claim 11, wherein the characteristic indicative of the trajectory pattern is determined by:
computing, based on an inertial coordinate system, a track of the one or more respective sets of target points across the one or more sensor data scans; and
determining whether a direction of the track is uniform in the inertial coordinate system.

14. The system of claim 11, wherein the characteristic indicative of the trajectory pattern is determined by:
computing, based on an inertial coordinate system, an average displacement vector between a first set of target points from a first sensor data scan captured at a first time instant and a second set of target points from a second sensor data scan captured at a second time instant later than the first time instant; and
determining whether a magnitude of the average displacement vector is greater than a threshold.

15. The system of claim 11, wherein the characteristic indicative of the trajectory pattern is determined by:
computing a respective point density for the respective set of target points; and
determining whether the respective point density is greater than a threshold.

16. The system of claim 11, wherein the one or more processors are operable to execute the instructions further to:
- determine a first characteristic and a second characteristic relating to the one or more respective sets of target points from one or more sensor data scans taken at consecutive time instants; and
- in response to determining that the first characteristic and the second characteristic have conflicting indications of whether the respective sets of target points relate to one or more static objects:
  - apply a pre-defined priority rule ranking the first characteristic and the second characteristic; and
  - adopt an indication associated with a respective characteristic that has a higher priority from the pre-defined priority rule.

17. The system of claim 11, wherein the one or more processors are operable to execute the instructions further to:
- monitor the characteristic with the sensor data scans taken in real time while the vehicle is traveling along a route; and
- in response to determining that the characteristic no longer satisfies the pre-defined condition, remove the indicator with the respective sets of target points as relating to the one or more static objects.

18. The system of claim 17, wherein the one or more processors are operable to execute the instructions further to:
- determine, over a period of time, a percentage of time when the respective set of target points is associated with the indicator as relating to the one or more static objects; and
- in response to determining that the percentage of time is less than a threshold, continue monitoring the respective set of target points in subsequent sensor data scans.

19. The system of claim 18, wherein the one or more processors are operable to execute the instructions further to:
- in response to determining that the percentage of time is greater than a threshold, remove target points corresponding to the respective set of target points in a subsequent sensor data scan.

20. One or more non-transitory computer-readable storage media embodying software that is operable when executed by a computing system to:
- obtain a plurality of sensor data scans captured, by a sensor unit placed on a vehicle, at a plurality of consecutive time instants while the vehicle is traveling along a route;
- identify a respective set of target points from each of the plurality of sensor data scans;
- determine a characteristic indicative of a trajectory pattern relating to one or more respective sets of target points, wherein the characteristic indicative of the trajectory pattern is determined by computing an average Doppler velocity between locations of the one or more respective sets of target points; and
- in response to determining that the characteristic satisfies a pre-defined condition, associate an indicator with the respective sets of target points as relating to one or more static objects in an environment at which the vehicle is situated.

* * * * *